(12) United States Patent
Laroque et al.

(10) Patent No.: US 6,456,710 B1
(45) Date of Patent: Sep. 24, 2002

(54) METHOD OF ACTIVATING A STATION

(75) Inventors: Christian Laroque, Rueil Malmaison; Jacques Litteaut, Marly le Roi, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/307,031

(22) Filed: May 7, 1999

(30) Foreign Application Priority Data

Jun. 2, 1998 (FR) ............................................ 98 06907

(51) Int. Cl.⁷ ................................................ H04M 7/00
(52) U.S. Cl. ............................ 379/220.01; 379/102.03
(58) Field of Search ....................... 379/102.01, 102.02, 379/102.03, 67.1, 219, 220.01, 221.01

(56) References Cited

U.S. PATENT DOCUMENTS 4,625,079 A * 11/1986 Castro et al. ....... 379/102.01 X
5,414,756 A * 5/1995 Levine .............. 379/102.01 X
6,021,324 A * 2/2000 Sizer, II et al. ..... 379/102.01 X

FOREIGN PATENT DOCUMENTS

EP          0 590 863 A2   4/1994
WO          WO 98/16072    4/1998

OTHER PUBLICATIONS

"PABX Networks", Electrical Communication, vol. 65, No. 1, Jan. 1, 1991, pp. 67–72, XP000264671.
Seveque, F. et al.: "ABC–13 A state–of–the–art private networking solution" L'"Onde Electrique, vol. 71, No. 5, Sep. 1, 1991, pp. 49–53, XP000263122.

* cited by examiner

*Primary Examiner*—Creighton Smith
(74) *Attorney, Agent, or Firm*—Sughrue Mion, PLLC

(57) ABSTRACT

To solve problems of standardization in signaling channels, which are becoming inextricable because of the proliferation of manufacturers and services, telephone configuration instructions are sent on data channels. Telephone central office receiving circuits include means for detecting in received messages an indication as to whether the received message must be interpreted as a modification instruction or as a normal data message.

10 Claims, 2 Drawing Sheets

METHOD OF ACTIVATING A STATION

BACKGROUND OF THE INVENTION

1. Field of the Invention

The present invention concerns a method of activating a station, in particular a telephone, connected to a telecommunication central office. The aim of the invention is to enable generalized remote management of any equipment connected to a telecommunication central office, for simplicity a telephone central office.

2. Description of the Prior Art

In the field of telecommunications, the functions of telephone central offices are well known. Central offices mainly use switching processes to interconnect different parties. Because technology has evolved, the parties are no longer always persons; they can be machines. In this case, the telephones are computers or other equipment units exchanging information, in particular digital data, using a particular protocol. Also, real time transmission as routinely used in the field of telephony has evolved toward off-line communication, using voicemail, electronic mail and, more generally, traffic management systems. Similarly, point-to-point communication on demand has been complemented by dedicated links and/or broadcasting, for example via the Internet. Finally, the technology has evolved from simple communication by wire to optical or radio transmission with time-division and/or frequency-division sharing of channels to increase capacity.

Administering all these equipment units has obliged telecommunication operators to distinguish between two types of information to be transmitted on communication channels. A first type of information relates to messages, i.e. to information that the parties wish to exchange. The other type of information relates to signaling. Signaling relates more directly to the administration of a telecommunication network. In practice signaling messages control PBX or public telephone central offices and choose protocols that messages must conform to at a given time to be exchanged correctly via the available communication channels. For example, in a T2 channel, a user granted access to the entire channel in fact has 30 channels for communicating data messages and a dedicated channel for transmitting signaling messages.

The dedicated transmission channel used for signaling messages has naturally been used by telecommunication plant manufacturers to exchange messages for conditioning equipment installed at different places in a network. The ABC F protocol has been developed for this purpose. The ABC F protocol is derived from the ISDN standard Q931. The ABC F protocol covers the organization of signaling messages and instruction codes in each message. In theory each manufacturer must conform to the protocol. Each manufacturer must therefore respect the syntax of the protocol in signaling messages.

However, experience shows that compliance with the above constraints cannot be assured because manufacturers are so varied and requirements are changing so fast. What is more, although each manufacturer might otherwise comply with the standard, because the equipment is so diverse and the manufacturers have diverse origins one manufacturer may choose an instruction with a syntax to correspond to one action and another manufacturer use an instruction with the same syntax for another action. In practice, not enough instruction codes are available.

Another problem that arises is that of remote management of telephones, or more generally of any equipment connected to a remote central office. In a PBX it is a simple matter, complying with a protocol specific to the PBX (called a proprietary protocol), and using circuits specific to the PBX, to control from any telephone connected directly to the PBX another telephone that is also connected directly to it. However, if another PBX similar to the first one is installed elsewhere, it is currently not possible to control from a station connected to the first PBX any of the stations connected to the second PBX as easily as controlling stations connected to the first PBX.

This would involve using the dedicated signaling channel (and the ABC F protocol, for example) to transmit commands and to attempt to navigate the accompanying inextricable organization. The phenomenon is all the more difficult to master in that a link to the other PBX from a first PBX may use a cascade of public central offices (or private PBX) whose protocols for transmission from one central to another do not necessarily conform to the ABC F standard. The link then requires translation. In many cases, translators lose some of the signaling information sent because it differs from the information that their essential mission is to translate.

This solution is nevertheless adopted because, given the standard, circuits are provided in each PBX and in each telephone to interpret instructions received on the dedicated signaling channel (to the ABC F protocol, for example) and have them executed by the telephone to which they are addressed. The equipment is therefore generalized worldwide, which implies a given type of operation, while the routing of corresponding messages progressively becomes impossible.

The aim of the invention is to overcome this drawback by proposing a virtual service network that is transparent to all transmission protocols used from one central office to another. It is even transparent to a transmission protocol used for links with stations connected directly to a PBX. The principle of the invention is to construct service messages and to send them on a normal data channel. The data channel can be of any type (X25, real time or off-line transmission, microwave or fiber optic, etc.). At the receiving end, an orientation circuit recognizes the nature of the signaling message in the receive message and orients it toward a corresponding action, in particular using circuits already present in the stations.

SUMMARY OF THE INVENTION

The invention therefore consists in a method of activating a station connected to a telecommunication central office including generation of an activation instruction followed by execution of the instruction by the station, the method including the following steps:

testing whether the instruction must be executed at a station connected to an originating central office at which the instruction is generated, if it must be executed at a station connected to another central office, establishing a network path between the originating central office and the other central office, constituting an activation message including information relating to the path, information relating to the instruction, target information relating to the telephone to be activated and activation information relating to the nature of the activation instruction in the message, transmitting the activation message in the network to the other central office, and in the other central office, reconstituting the instruction from the activation message and executing it in the station to be activated.

The invention will be better understood after reading the following description and examining the accompanying drawings which are given by way of non-limiting illustrative example only.

DETAILED DESCRIPTION OF THE PREFERRED EMBODIMENT

Figure 1:
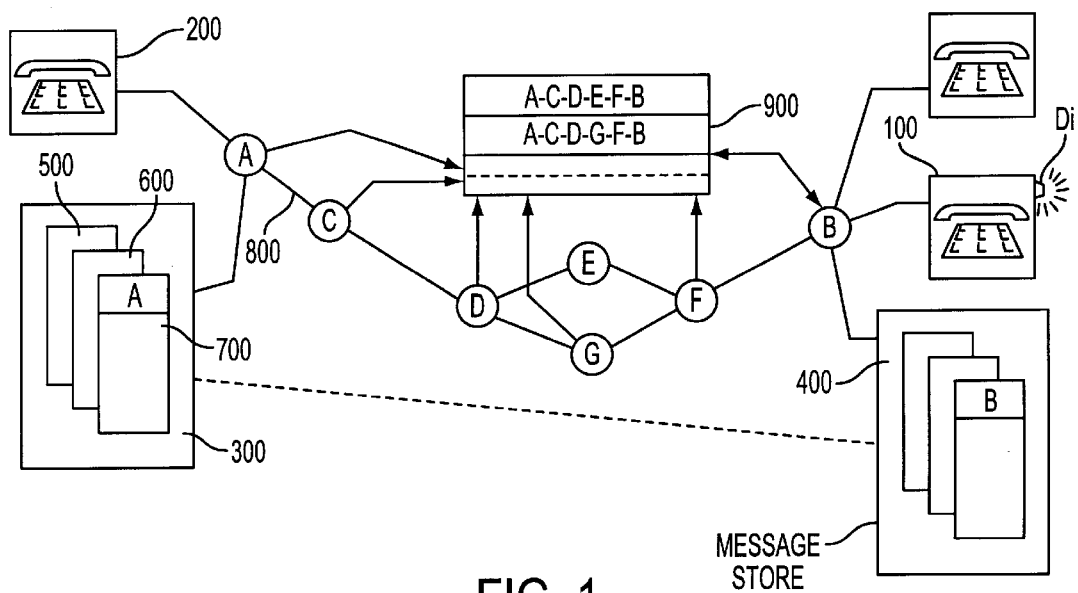
FIG. 1 is a diagrammatic representation of a telecommunication network, in particular a telephone network, which can be used to implement the method of the invention.

FIG. 1 is a diagrammatic representation of a telecommunication network, in particular a telephone network, which can be used to implement the method of the invention. The telephone network includes a number of telephone central offices A to G connected to each other and constituting one or more paths for transmission from a central office A to a central office B. The problem to be solved by the invention is that of controlling from a central office A a station 100 connected to a central office B. The station 100 can be a telephone. It can also be a microcomputer or another type of equipment unit with its own operating system. The equipment unit 100 includes a peripheral circuit Di, for example a charge metering circuit, a fault reporting circuit, a character mode connection circuit of the station 100, equipment for updating a database available in the station 100, a videophone network control circuit, etc.

For simplicity, the circuit Di can be a diode to be turned on at station 100 from central office A, for example to convey particular information to the user of station 100. Central office A is controlled by a station 200 which is connected to it and which can also be a telephone or some other equipment unit, like the station 100. Each central office A to G is associated with a respective memory circuit, e.g. circuits 300 and 400 for exchanges A and B. Circuits 300 and 400 store different information. For example, circuit 300 conventionally stores an operating system 500 of central office A, a set 600 of application programs created by users of central office A or station 200, and a set 700 of data. The data of the set 700 includes an ID A (or B for central office B) representative of the telephone central office. This ID may of course be encoded on a large number of bits. Central offices A to G are interconnected by links such as the link 800 which can be of any type: wire, microwave, fiber optic, and support any protocol: analog, digital, synchronized, asynchronous, etc.

The network conventionally further includes a router 900 for organizing the routing of calls between central offices A to G. For a route from central office A to central office B the router 900 holds information ACDEFB in one record or information ACDGFB in another record indicating the paths that messages must take to be transmitted from central office A to central office B. The router 900 can be a centralized unit. It can also be decentralized, each of central offices A to G including part of it.

Figure 2:
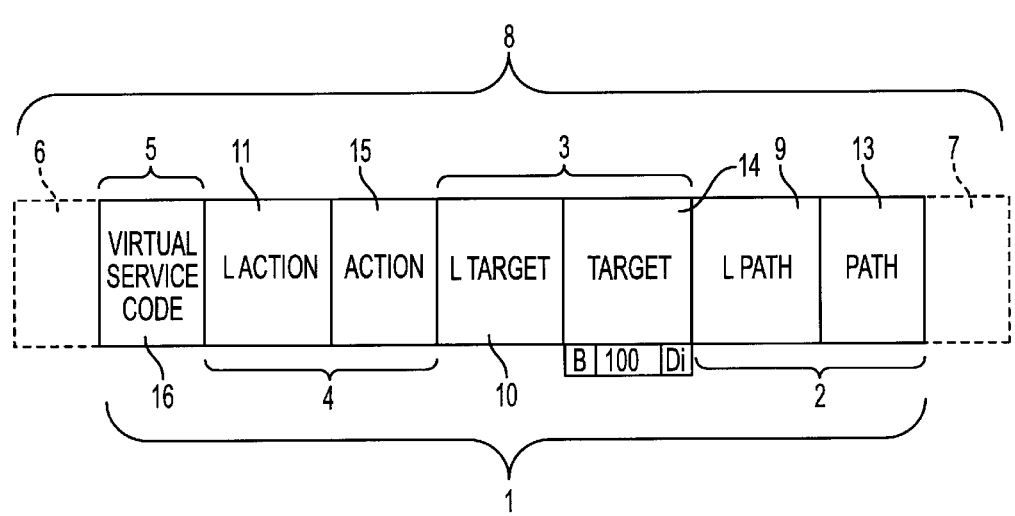
FIG. 2 shows a signaling message in accordance with the protocol of the invention which is preferably transmitted via a data channel.

The invention uses a data channel to transmit signaling messages instead of the dedicated signaling channel normally provided for this purpose. A first step of the method of the invention therefore consists in constructing a message for activating station 100. FIG. 2 shows the activation message 1. It has four main parts. A first part 2 concerns the path that the message must take to be transmitted from central office A to the destination central office B. A second part 3 concerns the target, namely, in clear, a designation of station 100 in central office B and, in station 100, the ID of a peripheral Di to which the action refers. A third part 4 concerns the action which must be executed on the peripheral Di. For example, this action is to operate a switch to turn on the diode Di. A fourth part 5 indicates the nature of the virtual service instruction in the activation message 1. This is the presence of a character string, for example, such as VSC.

The activation message 1 is then in practice encapsulated by a header 6 and a trailer 7 to form a conditioned message 8, employing a protocol used by each link 800 in succession. If necessary, the path information 2 is incorporated in the encapsulation 6 or 7 and forms part of it. The message 8 is transmitted on a data channel. Its content of information useful to the user is limited to the content 1 and even more particularly to the content 3—4—5. The various parts 2, 3, 4 and 5 of the message 1 can each be preceded by a respective length indication 9 to 11 indicating, in a variable length mode, the length of a respective indication 13 to 16 representative of the path, the address of the target, the action to be taken and a virtual service code, respectively.

Figure 3:
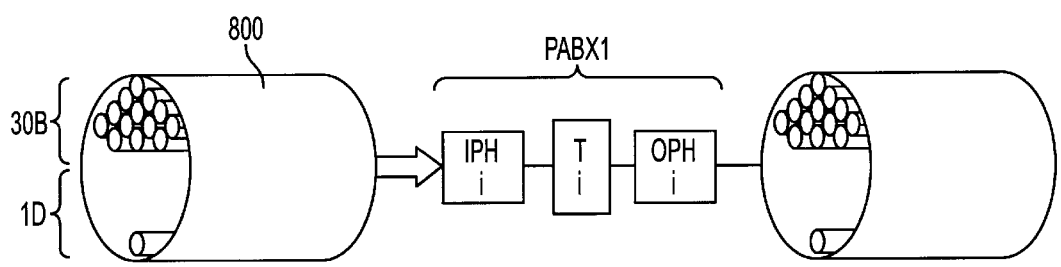
FIG. 3 is a diagrammatic representation of a PBX, or more generally a telephone central office, modified to implement the method of the invention.

In regard to the invention, FIG. 3 shows the operations performed by each of the central offices (or PBX) C to G placed on the transmission path from A to B. They are connected to transmission channels 800 receiving data channels and dedicated signaling channels. A T2 type channel referred to above is shown symbolically and by way of example with 30 non-dedicated data channels B and one dedicated signaling channel D. The central office includes a first input circuit IPHi (Input Packet Handler) for processing the header 6 and the trailer 7 of the message 8, in particular to verify the integrity of the transmitted message 1. The central offices also include circuits Ti for processing the messages addressed to them. If the central offices merely act as relay stations, they transmit messages received to output circuits OHPi having the converse function, from this point of view, to the input circuits IPHi, i.e. re-establishing the header 6 and the trailer 7 of the message, or modifying them if the next transmission channel uses a different protocol. A circuit OPHi therefore forwards a message 8 if the associated circuit Ti is not the destination of the message. The essential function of the intermediate central offices is to forward the message 1 in full without degrading it in any way.

Figure 4:
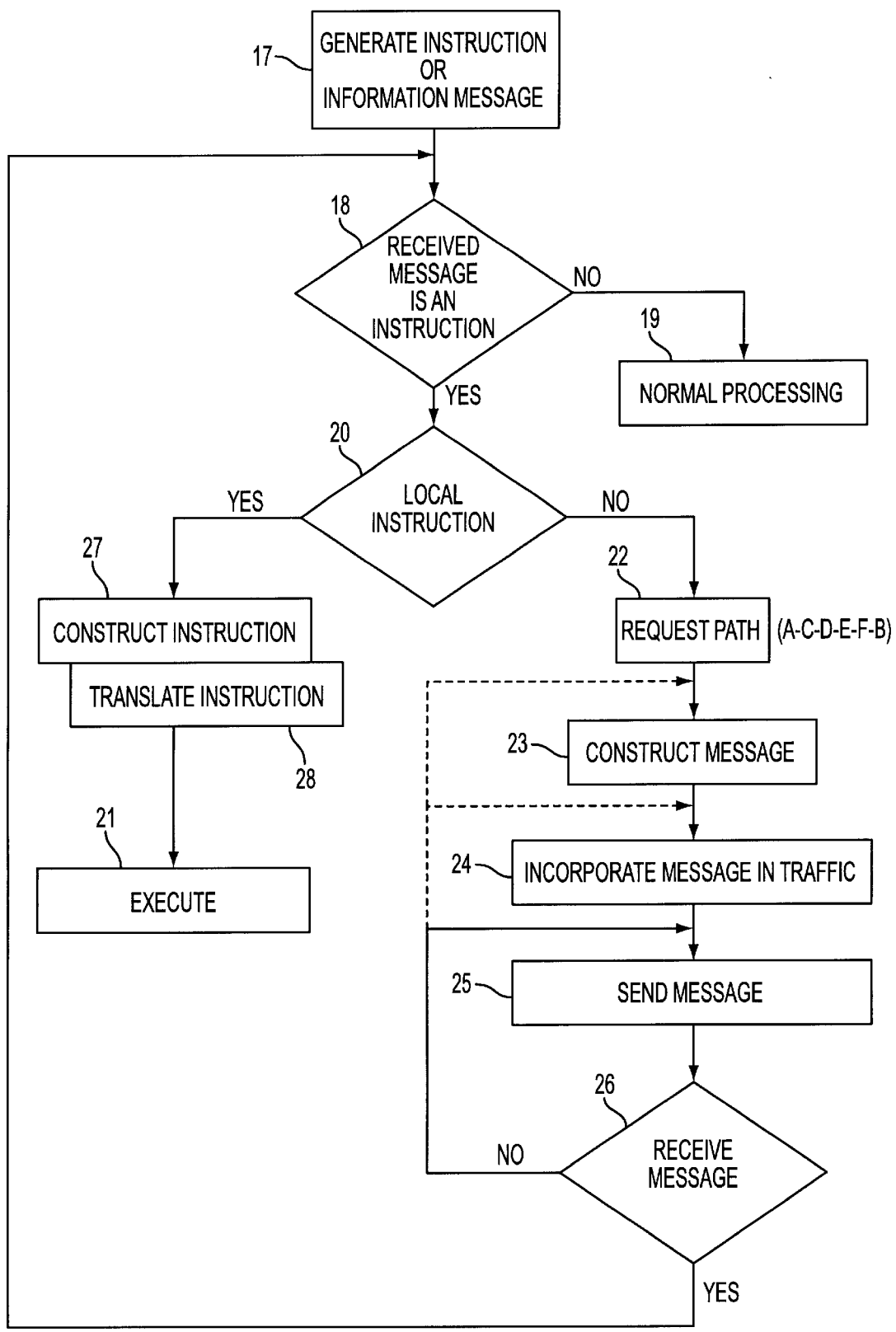
FIG. 4 shows the essential steps of the method of the invention.

The circuits IPH and OPH are modified in each central office provided with means for implementing the method of the invention. In practice there is no new equipment to be installed. Preferably only the operating system 500 or the application program 600 of the central offices are modified. FIG. 4 shows the content of the programs to be executed for this purpose.

An instruction 17 is also generated by an operator, for example from station 200. In one example the aim of this instruction is to turn on (this is the action) a diode Di on the station 100 connected to the central office B (this is the target). This instruction therefore essentially comprises, as arguments, parts 3, 4 and 5 (or corresponding information for this latter part). Part 5 is preferably added automatically in a programming tool, a programming language used by the operator to compose instruction 17. Accordingly, the programming for this operation is free of constraints and transparent. Because it designates an action and a target, the entire instruction is composed by the automatic addition of part 5. After an instruction of this kind has been generated in phase 17, it is transmitted to the circuits IPH—OPH of central office A. The program 600 (or 700) of central office A then has the circuits IPH—OPH carry out a first test 18 to determine if the message received from station 200 is an instruction or not. Test 18 consists in examining area 16 of message 1 constructed, at least in part, during step 17. For example, if an instruction code VSC is present in message 1, test 18 deduces that this is an instruction message and processes it accordingly. Otherwise, the circuit IPH—OPH transmits the message normally, in the usual manner, as if it were an information message, in step 19.

The code VSC in area 16 can be replaced by a particular architecture of the information 14 and 15 or by any other means. The virtual code VSC added to message 1 is nevertheless the preferred method.

Central office A determines if the instruction is to be executed locally or not during a test 20 following test 18. To this end it looks at the target for the instruction. If the target is station 200 connected to central office A, the instruction is executed immediately (21), the action 15 having been programmed by the operator of station 200 (or another station) in a language understood by the circuit IPH and by the peripheral circuits of central office A.

On the other hand, if the target is a remote target, station 100 connected to central office B, then the circuit IPH of the invention submits a request 22 to the router 900 to determine the path for sending the signaling message corresponding to the instruction. The circuit 900 then sends to the circuit IPH the preferred path ACDEFB (or another path) for routing the message. During an operation 23 the circuit IPH finalizes message 1 by concatenating information 9 through 16. The circuit IPH—OPH then incorporates message 1 into the traffic in step 23, as it has already done for information messages for which central office A is merely a relay station. In particular it constructs message 8 with its header 6 and trailer 7. Message 8 is transmitted in step 25 to the first central office connected to central office A; this is central office C.

The conditioning of the message 1 can include an indication in the header 6 or the trailer 7 of the path ACDEFB determined in step 22. If necessary, the information 2 is part of the information 6 or 7. In some cases, the information 6 or 7 can be sent on the signaling channel while the remainder of the message 1 is sent on a data channel, in accordance with the invention. This type of conditioning is conventional and the intervention of the router 900 to deliver the path is also known per se.

During a test 26, central office C determines if the message 8 received, partly via a data channel, is addressed to a peripheral connected to central office C or not. If not, the message is forwarded to a subsequent central office in an operation 25. If necessary, this forwarding is accomplished by central office C reconditioning the message (step 23) or reincorporating it in the traffic (step 24). During test 26, the circuits IPH and OPH of central offices C, D, E, F encountered merely test the header 6 and trailer 7, and modify them if there is a change of protocol. During test 26, these intermediate central offices can determine if they are the destination of message 1 or not. Message 8 travels in this way from central office A to central office B.

When it reaches central office B, the circuit IPH of central office B recognizes that it is the destination of the message by recognizing its own ID in the header 6 or trailer 7. It can also recognize it in the target information 14 if it includes means in accordance with the invention. It then decrypts part 5 of message 1 in step 18 to determine if message 18 is an instruction. As previously, if not, it is information to be processed in some other way and processing 19 known per se is performed.

On the other hand, if a VSC indication is recognized in area 16, the instruction must be executed, but this time it must be executed locally during operation 21, in central office B because it relates to central office B, station 100 and peripheral Di which it has reached.

The circuit IPH provides instructions 27 for physically constructing an instruction from the received activation message. This is known per se. Under the previously mentioned ABC F standard, an instruction sent in compacted form on a signaling channel of a channel 800 must be formed into a succession of operations, in particular by the operating system 500, in the case of the operation to be performed on the peripheral Di. Such means 27 therefore exist already. The invention makes use of them.

Because the invention no longer uses the ABC F standard to send messages, the operating system 500 or application programs 600 of central office B may be different from those of central office A. In this case they must additionally include, in a supplemental application in accordance with the invention, means 28 for translating the instruction into a language they understand. In this case the means 27 and 28 generally form a single program.

To summarize, the PH circuits (IPH and OPH) of the invention concatenate the path, target and action information with a specific virtual service code indication. They can test for the presence of the VSC indication to determine whether or not to execute the information transmitted as an instruction and, if necessary, have supplemental functions for translating the instruction into a language that can be understood by the associated units.

To this end, the message 1 can further include supplemental information, not shown in FIG. 2, representing the version of the language used in central office A to generate the instruction. Clearly, with upward compatibility, central office B, if of more recent design than central office A, will still be able to execute instructions emanating from central office A. It will have as many translation functions as there are possible versions.

By way of an improvement, message 1 could also include a password specific to central office B, or even to station 100 or peripheral Di, to prevent anyone who does not know the password modifying the operation of station 100. The password is therefore incorporated into message 1 at central office A and received and verified by the circuits IPH—OPH of central office B, which also carries out the necessary verification.

Finally, the method of the invention can be used to broadcast the same instruction to all the stations of a network. In this case, it may be sufficient to leave blank in the target information, in the address, the areas assigned to B and/or to 100 and/or to Di, for example, in order to designate all or part of this equipment.

Finally, note that the respective positions of tests 18 and 20 can be interchanged, with corresponding displacement of actions 21 and 22.

What is claimed is:

1. A method of activating a station connected to a telecommunication central office, including generation of an activation instruction followed by execution of the activation instruction by said station, said method including the following steps:

testing whether the activation instruction must be executed at a station connected to an originating central office, establishing a network path between the originating central office and another central office, if the activation instruction must be executed at a station connected to said other central office, constituting an activation message including path information, activation instruction information, target information relating to the station to be activated and information relating to the nature of the activation instruction in said activation message, transmitting said activation message in said network to said other central office, and in said other central office, reconstituting said activation instruction from said activation message and executing said activation instruction by a station connected to said other central office.

2. The method claimed in claim 1, wherein establishing the network path includes retrieving path information from a routing memory.

3. The method claimed in claim 1, wherein constituting activation instruction information includes translating the activation instruction into a specific language.

4. The method claimed in claim 1, wherein constituting said target information, includes concatenating information on an address of said other central office, information on an address of said station and an address of a peripheral attached to said station.

5. The method claimed in claim 4, wherein constituting said target information includes concatenating with at least one of the following, said station information and peripheral information, with broadcast information relating to said central offices or said stations.

6. The method claimed in claim 1, wherein constituting said information relating to the nature of said activation instruction in said activation message includes incorporating a predetermined character string in said activation message.

7. The method claimed in claim 1, wherein a password is added to said activation message, said password is verified in said other central office and a designated station is activated if the result of said verification is correct.

8. A method, implemented within a telecommunication network having a plurality of central offices and stations, for activating a station connected to one of said plurality of central offices, including generation of an activation message transmitted on a non-dedicated data channel, followed by execution of an instruction contained in the activation message by said station, said method comprising:

determining whether a message is an instruction, and if so, determining whether the instruction must be executed at a station connected to an originating central office, executing the instruction when the instruction must be executed at a station connected to the originating central office, establishing a network path between the originating central office and another central office, when the instruction must be executed at a station connected to said other central office, generating an activation message including path information, instruction information, target information and nature of the activation instruction information, transmitting said activation message in said telecommunication network to said other central office, and regenerating an activation message in the other central office and executing the instruction in the station connected to said other central office.

9. The method of claim 8, wherein each central office is provided with a means for implementing the method of claim 8.

10. The method of claim 8, wherein each central office comprises a circuit that performs the method of claim 8.

* * * * *